(12) United States Patent
Jerez et al.

(10) Patent No.: US 11,816,690 B1
(45) Date of Patent: Nov. 14, 2023

(54) PRODUCT EXCHANGE SYSTEM INCLUDING PRODUCT CONDITION BASED PRICING IN ELECTRONIC MARKETPLACE AND RELATED METHODS

(71) Applicant: INMAR SUPPLY CHAIN SOLUTIONS, LLC, Winston-Salem, NC (US)

(72) Inventors: Leonel D. Jerez, Pfafftown, NC (US); Matthew Lingelbach, Clemmons, NC (US); Michael Lichtner, Lexington, NC (US); Joseph P. Marcaurelle, Winston-Salem, NC (US); Brian S. Rogers, Greensboro, NC (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 0 days.

(21) Appl. No.: 17/592,041

(22) Filed: Feb. 3, 2022

(51) Int. Cl.
G06Q 30/00 (2023.01)
G06Q 30/0208 (2023.01)
G06Q 30/0207 (2023.01)

(52) U.S. Cl.
CPC ..... *G06Q 30/0208* (2013.01); *G06Q 30/0225* (2013.01); *G06Q 30/0239* (2013.01)

(58) Field of Classification Search
None
See application file for complete search history.

(56) References Cited

U.S. PATENT DOCUMENTS 8,533,126 B1 9/2013 Anthony et al.
9,811,632 B2 11/2017 Grabiner et al.
(Continued)

FOREIGN PATENT DOCUMENTS

| CA | 2933160 A1 * | 10/2006 | ........... G06Q 20/387 |
| WO | WO-0167344 A1 * | 9/2001 | ............. G06Q 30/06 |
| WO | WO-2020196945 A1 * | 10/2020 | ............. G06Q 30/00 |

OTHER PUBLICATIONS

Lee, Chang Hwan, and Byong-Duk Rhee. "Retailer-run resale market and optimal returns and resale policy." European Journal of Operational Research 268.2 (2018): 504-514. (Year: 2018).*
(Continued)

*Primary Examiner* — Michael Bekerman
(74) *Attorney, Agent, or Firm* — ALLEN, DYER, DOPPELT, + GILCHRIST, P.A. Attorneys at Law

(57) ABSTRACT

A product exchange system may include a first purchaser device associated with a first purchaser, and a second purchaser device associated with a second purchaser having a shipping address. The system may also include a product exchange server configured to obtain image data of a purchased product for return from the first purchaser device, and determine, using a machine learning algorithm, a product condition of the purchased product for return based upon the obtained image data. The server may also determine, using the machine learning algorithm, a resale price of the purchased product for return based upon the determined product condition, and operate an electronic marketplace for resale of the purchased product for return at the resale price. The server may also communicate the shipping address to the first purchaser device based upon a purchase of the purchased product for return by the second purchaser in the electronic marketplace.

31 Claims, 4 Drawing Sheets

(56) References Cited

U.S. PATENT DOCUMENTS

| | | | |
|---|---|---|---|
| 2009/0089175 A1* | 4/2009 | Platek | G06Q 10/08 |
| | | | 705/26.1 |
| 2009/0094260 A1* | 4/2009 | Cheng | G06Q 30/0643 |
| 2018/0197139 A1 | 7/2018 | Hill | |
| 2019/0370837 A1* | 12/2019 | Shamiss | G06Q 30/0278 |
| 2020/0402001 A1* | 12/2020 | Kentris | G06Q 30/0222 |
| 2021/0150616 A1 | 5/2021 | Kentris et al. | |
| 2021/0334865 A1* | 10/2021 | Irey | G06Q 30/0283 |
| 2022/0147927 A1* | 5/2022 | Kieboom | H04W 4/02 |
| 2022/0180405 A1* | 6/2022 | Furlan | G06F 16/245 |

OTHER PUBLICATIONS

Stuart, Julie Ann, et al. "Reducing costs through improved returns processing." International journal of physical distribution & logistics management 35.7 (2005): 468-480. (Year: 2005).*

Maxwell et al., U.S. Appl. No. 17/726,938, filed Apr. 22, 2022.

\* cited by examiner

PRODUCT EXCHANGE SYSTEM INCLUDING PRODUCT CONDITION BASED PRICING IN ELECTRONIC MARKETPLACE AND RELATED METHODS

TECHNICAL FIELD

The present embodiments are directed to the field of image processing, and, more particularly, to processing purchased products for return based upon image data and related methods.

BACKGROUND

Returning a purchased item may be part of the retail process. Returning a purchased item to a retailer may involve, the purchaser taking the purchased item, usually along with a receipt, back to the retailer in exchange for a refund, exchange, merchandise credit, etc. For online purchases, for example, returning a purchased item may include requesting a return authorization from the retailer, repackaging the purchased item in a box or acceptable shipping container, affixing return shipping information to the box or container, and placing the box or container including the purchased item and return shipping information with the appropriate shipping provider.

From the retailer or merchant perspective, processing returns may consume a relatively large amount of resources. For example, a returned product may be used and/or damaged, which may make it unsuitable for resale within the retailer's sales channels.

An online or electronic marketplace is a type of electronic commerce website where product or service information is provided by one or more third parties. In an electronic marketplace, transactions are typically processed by the marketplace operator and then delivered and fulfilled by the participating retailers or wholesalers. The electronic marketplace operator typically charges a fee for processing these transactions.

U.S. Pat. No. 8,533,126 to Antony et al. is directed to dynamic determination of item returns during transit. A system is configured for receiving information from a customer regarding a return of an item from the customer, the item having previously been supplied to the customer from a merchant, and determining, by one or more configured computing systems of the merchant, one or more types of information to include with the return of the item, the determined one or more types of information for use in a later determination of a final return destination for the item. The system is configured for providing, by the one or more configured computing systems of the merchant, information to the customer to direct the item being returned to an intermediate destination from which items can be shipped, the intermediate destination being a third-party intermediate facility that is operated by an entity distinct from the merchant and from the customer. The provided information enables generation by the customer of a shipping label for use with the return of the item. The generated shipping label has encoded information of the determined one or more types. The system is configured for, after a package is received at the third-party intermediate facility that contains the item being returned and that has the generated shipping label on an exterior of the package, obtaining the encoded information of the determined one or more types from the shipping label on the package, determining one of multiple possible return destinations to use for the item based at least in part on current conditions and on the obtained encoded information of the determined one or more types, and initiating shipping of the package containing the item from the third-party intermediate facility to the determined one return destination.

U.S. Pat. No. 9,811,632 to Grabiner et al. is directed to a system for electronically indicating the acceptability of a product. More particularly, an image capture and communication device may analyze a product label that includes one or more monitors, authentication elements, and identification elements. The image capture and communication device may determine the type and features of the monitors, authentication elements, and identification elements. The image capture and communication device may transmit data based on the type and features to a host server, which may transmit data associated with the host product to the image capture and communication device in, inter alia, the form of an acceptability report.

SUMMARY

A product exchange system may include a first purchaser device associated with a first purchaser, and a second purchaser device associated with a second purchaser having a shipping address. The product exchange system may also include a product exchange server configured to obtain image data of a purchased product for return from the first purchaser device, and determine, using a machine learning algorithm, a product condition of the purchased product for return based upon the obtained image data. The product exchange server may also be configured to determine, using the machine learning algorithm, a resale price of the purchased product for return based upon the determined product condition, and operate an electronic marketplace for resale of the purchased product for return at the resale price. The product exchange server may further be configured to communicate the shipping address of the second purchaser to the first purchaser device based upon a purchase of the purchased product for return by the second purchaser in the electronic marketplace via the second purchaser device.

The product exchange server may be configured to generate and communicate a digital promotion to the first purchaser via the first purchaser device, for example. The purchased product for return may have a brand associated therewith; and wherein the digital promotion is redeemable toward another product of the brand.

The product exchange server may be configured to generate and communicate a digital promotion to the second purchaser via the second purchaser device. The digital promotion may be redeemable toward purchase of another product on the electronic marketplace, for example.

The product exchange server may be configured to determine the resale price based upon learning resale prices for other products for return corresponding to a same product condition. The product condition may be among a plurality thereof, and wherein the product exchange server may be configured to determine the product condition based upon comparing the image data to baseline image data for each of the plurality of product conditions, for example. The product exchange server may be configured to generate a shipping label and communicate the shipping address within shipping label, for example.

A method aspect is directed to a method of processing a product exchange. The method may include using a product exchange server to obtain image data of a purchased product for return from a first purchaser device associated with a first purchaser, and determine, using a machine learning algorithm, a product condition of the purchased product for return based upon the obtained image data. The method may also include using the product exchange server to determine, using the machine learning algorithm, a resale price of the purchased product for return based upon the determined product condition, and operate an electronic marketplace for resale of the purchased product for return at the resale price. The method may further include using the product exchange server to communicate a shipping address of a second purchaser to the first purchaser device based upon a purchase of the purchased product for return by the second purchaser in the electronic marketplace via a second purchaser device associated with the second purchaser.

A computer readable medium aspect is directed to a non-transitory computer readable medium for processing a product exchange. The non-transitory computer readable medium includes computer executable instructions that when executed by a processor cause the processor to perform operations. The operations may include obtaining image data of a purchased product for return from a first purchaser device associated with a first purchaser, determining, using a machine learning algorithm, a product condition of the purchased product for return based upon the obtained image data, and determining, using the machine learning algorithm, a resale price of the purchased product for return based upon the determined product condition. The operations may also include operating an electronic marketplace for resale of the purchased product for return at the resale price, and communicating a shipping address of a second purchaser to the first purchaser device based upon a purchase of the purchased product for return by the second purchaser in the electronic marketplace via a second purchaser device associated with the second purchaser.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
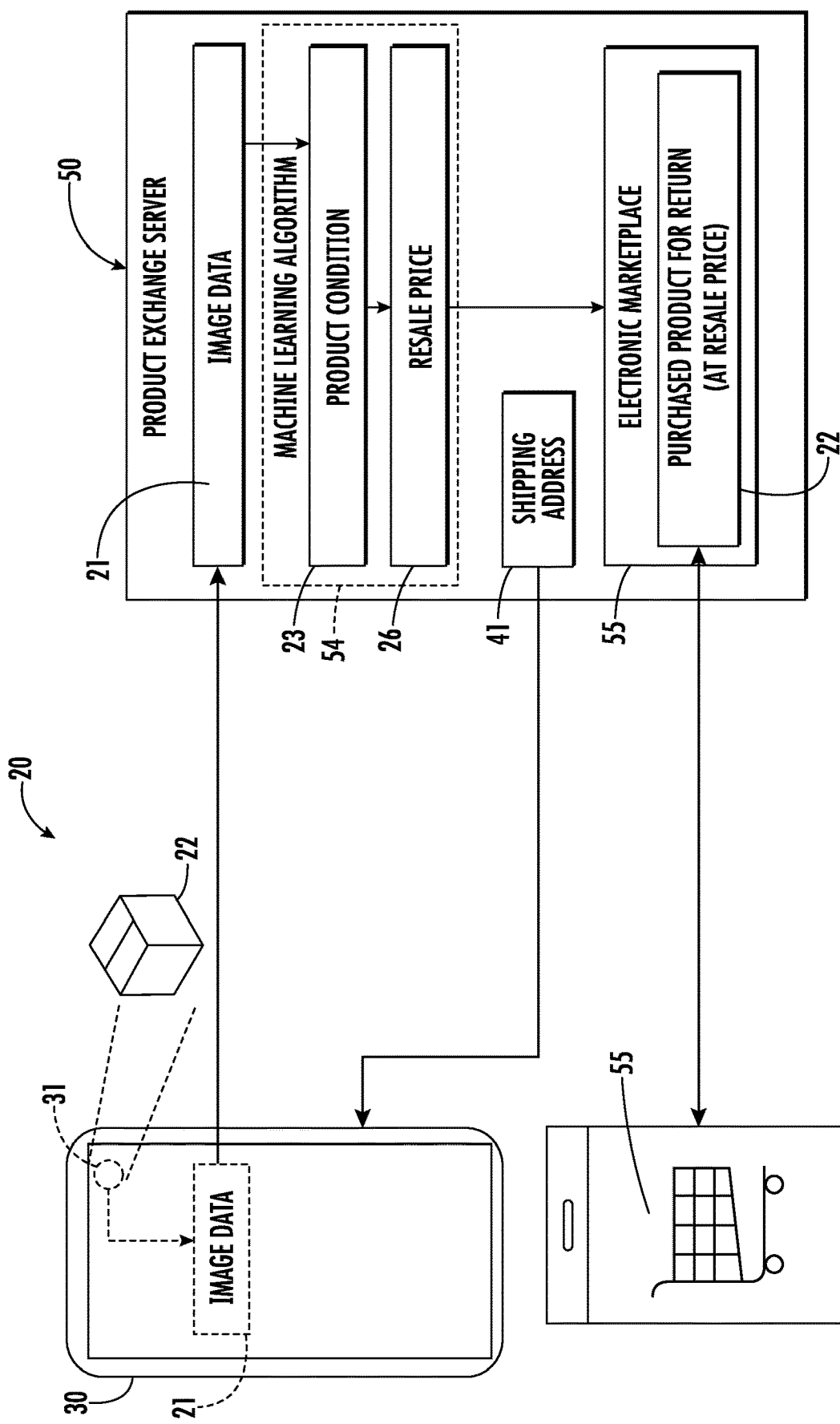
FIG. 1 is a schematic diagram of a product exchange system in accordance with an embodiment.
Figure 2:
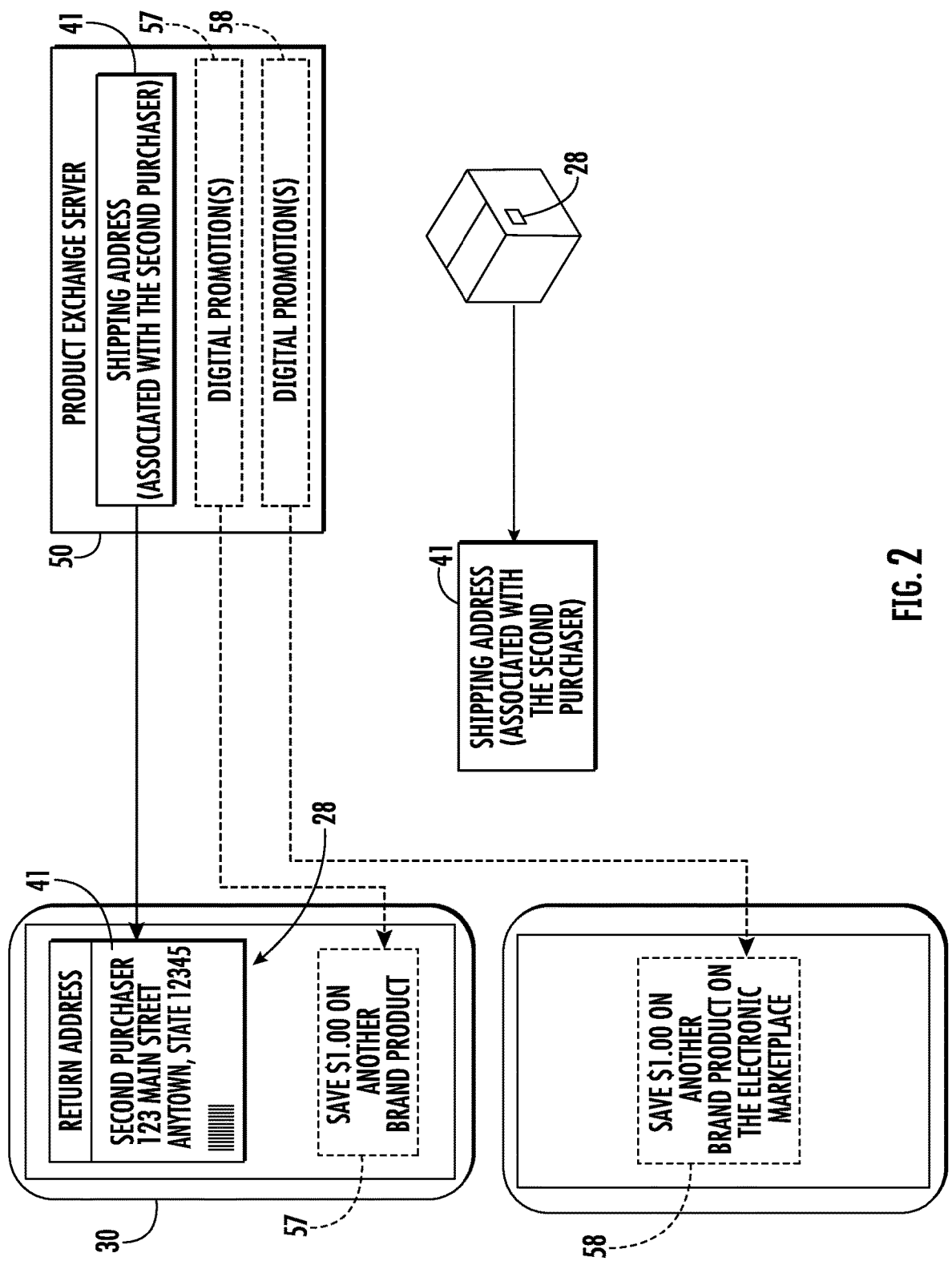
FIG. 2 is another schematic diagram of the product exchange system of FIG. 1.
Figure 3:
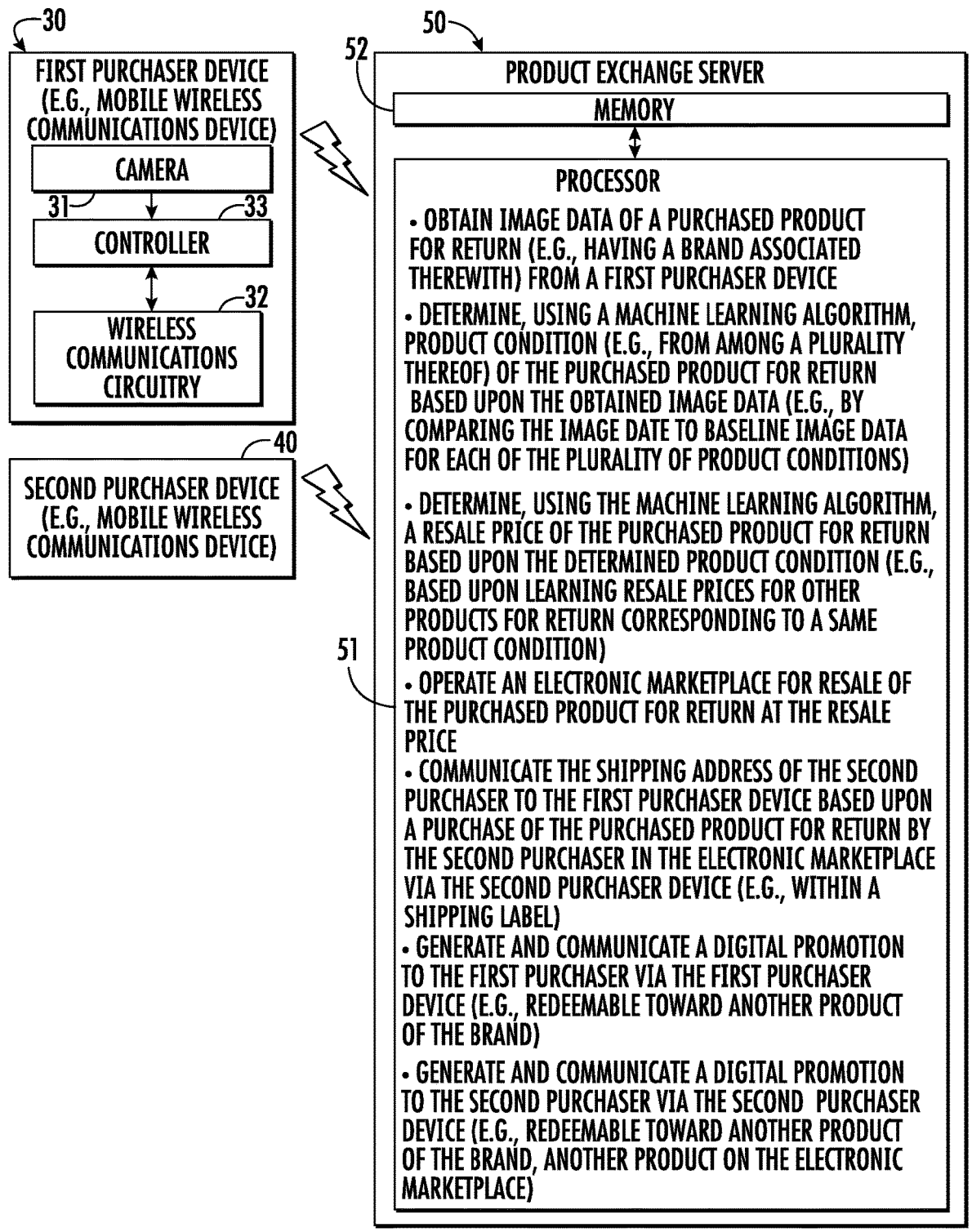
FIG. 3 is a schematic block diagram of the product exchange system of FIG. 1.

Referring initially to FIGS. 1-3 a product exchange system 20 includes a first purchaser device 30 associated with a first purchaser. The first purchaser device 30 is illustratively in the form of a mobile wireless communications device, for example, a smartphone. The first purchaser device 30 may be another type of device, for example, a desktop or laptop computer, a tablet computer, or a wearable device.

The product exchange system 20 also includes a second purchaser device 40 associated with a second purchaser. Similarly to the first purchaser device 30, the second purchaser device 40 is illustratively in the form of a mobile wireless communications device, for example, a smartphone. The second purchaser device 40 may be another type of device, for example, a desktop or laptop computer, a tablet computer, or a wearable device. The second purchaser has a shipping address 41, for example an address where packages or e-commerce purchases are shipping for the second purchaser (FIG. 2).

The product exchange system 20 also includes a product exchange server 50. The product exchange server 50 includes a processor 51 and an associated memory 52. While operations of the product exchange server 50 are described, it should be understood the operations are performed by way of cooperation between the processor 51 and the memory 52.

Figure 4:
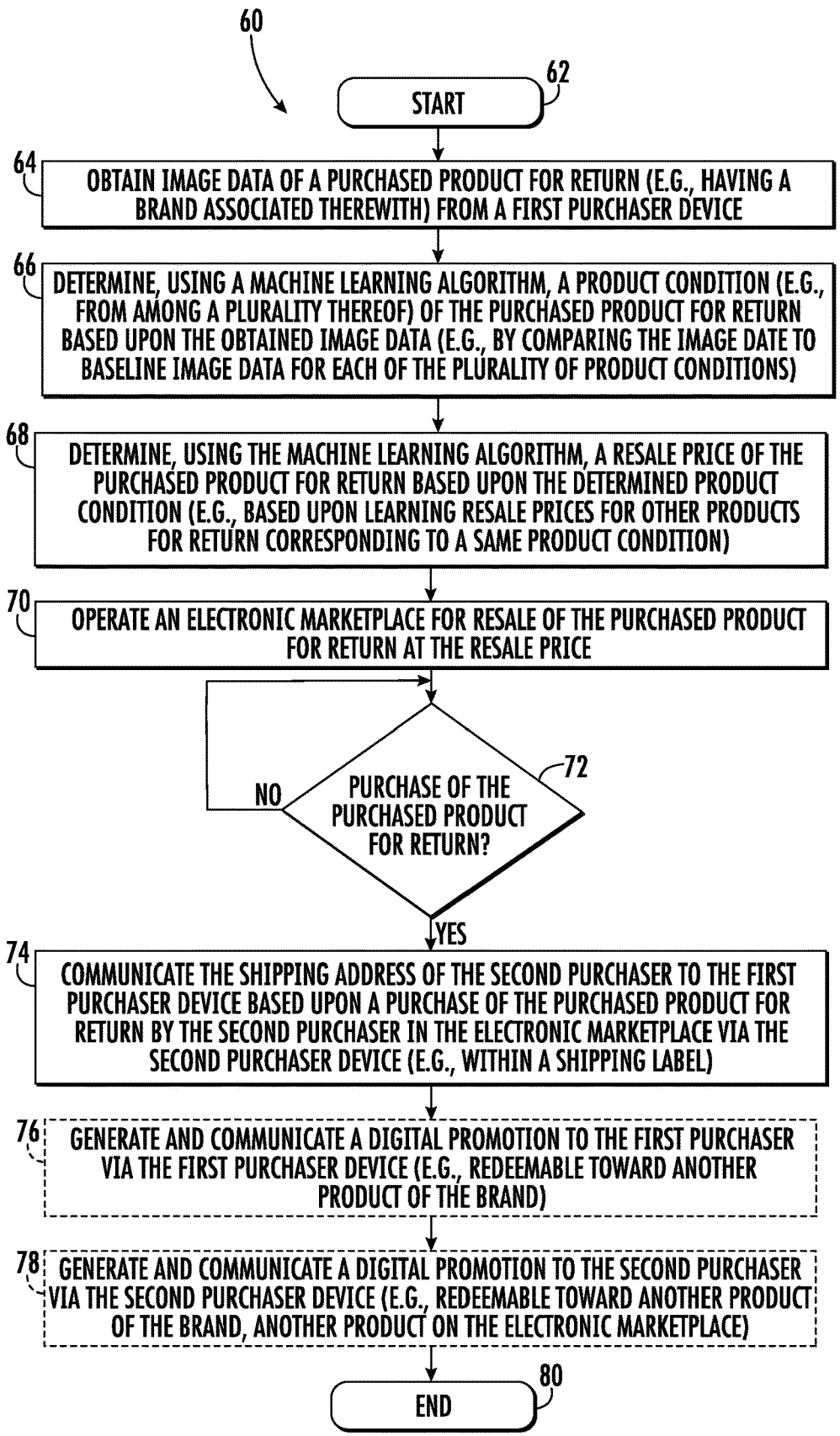
FIG. 4 is a flow diagram illustrating operation of the product exchange server of FIG. 3.

Referring now to the flowchart 60 in FIG. 4, beginning at Block 62, operations of the product exchange server 50 will be described. At Block 64, the product exchange server 50 obtains image data 21 of a purchased product for return 22 from the first purchaser device 30. The purchased product for return 22 may be product purchased by the first user that the first user wishes to return, for example, for a refund, credit, or exchange. For example, the first user may wish to return the product for return 22 based upon a product defect, based upon the product for return being not as advertised, or other reason, as will be appreciated by those skilled in the art. The purchased product for return 22 may have been purchased in a brick-and-mortar store or online at an e-commerce store.

The product exchange server 50 may obtain the image data 21 wirelessly from the first purchaser device 30. For example, the first purchaser device may include a camera 31 and wireless communications circuity 32 coupled a controller 33. An image of the product for return 22 may be acquired via cooperation between the controller 33 and the camera 31, and the associated image data may be wirelessly communicated via cooperation between the controller and the wireless communications circuitry 32.

The product exchange server 50, at Block 66, determines, using a machine learning algorithm 54, a product condition 23 of the purchased product for return 22 based upon the obtained image data 21. More particularly, in embodiments, the product exchange server 50 may segment the image data into segments corresponding to the different parts of the purchased product for return 22. The segmentation may be performed based upon a product identifier (e.g., UPC, SKU, etc.), for example, such that image segments may correspond to area of the purchased product for return 22 that may be more readily identify the product condition (e.g., corners, wear areas, etc.). The image data may be compared to baseline image data, for example, based upon training data. When the image data 21 is segmented, for example, the product condition 23 may be identified based upon comparison of each segment to a baseline. The determination of the product condition 23 may be input to the machine learning algorithm 54 such that the machine learning algorithm is updated using the obtained image data 21.

The determined product condition may be one of a plurality of product conditions, for example, enumerated categories (e.g., poor, fair, good, excellent, like new). In embodiments where the determined product condition is one of a plurality of product conditions, such as, for example, enumerated categories, the product exchange server 50 may apply or use the machine learning algorithm 54 to determine the product condition 23 based upon a most closely match to learned product conditions for the given category, for example, by using bins of a histogram corresponding to the categories of product condition for applying and learning a probabilistic distribution. In some embodiments, the determined product condition 23 may be represented by a numerical score, for example, a scale of 0-100 with 100 corresponding to "new in the package" while 0 may correspond to "significant damage".

The product exchange server 50 determines, using the machine learning algorithm 54, a resale price 26 of the purchased product for return 22 based upon the determined product condition (Block 68). More particularly, the product exchange server 50 may learn, by way of learned correlations, what product conditions correspond to what resales prices for the purchased product for return 22. The product exchange server 50 may learn resale prices based upon other products for return corresponding to the same product condition. The resales prices may be learned for the same product for return or a different, but closely related product, for example, different color, earlier edition, and/or based upon product identifier, such as same family codes.

The product exchange server 50 may retrieve or obtain for storage in the memory 52, previous or historical resale purchase data, including historical resales prices and conditions for the same or similar product to the purchased product for return, input to the machine learning algorithm 54 for training. The historical resale data may be obtained from other websites, and/or include point-of-sale (POS) terminal data at secondhand stores or resellers, or resale data from one or more electronic marketplaces, as will be described in further detail below. While a single machine learning algorithm 54 is described for both determining the product condition 23 (Block 66) and determining the resale price 26 (Block 68), those skilled in the art will appreciate the machine learning algorithm 54 may include two machine learning algorithms whereby an output of one machine learning algorithm is fed as an input to another machine learning algorithm.

At Block 70, the product exchange server 50 operates an electronic marketplace 55 for resale of the purchased product for return 22 at the resale price 26. By operating an electronic marketplace 55, the product exchange server permits listing of the purchased product for return 22 in a virtual or online store at the resale price 26 such that other users, for example, the second user, by way of the second purchaser device 40, may browse many purchased products for return and purchase any one or more the purchased products for return. The product exchange server 50 through the electronic marketplace 55 may process payments from the buyer of the purchased product for resale 22 (i.e., second purchaser) while providing payment to the seller (i.e., first purchaser) of the purchased product for return. In some embodiments, the second purchaser may provide input of a desired product for purchase for matching to a purchased product for return upon listing on the electronic marketplace 55. In some embodiments, the second purchaser may be unaware the purchased product for return is being provided from the first purchaser, but rather it may appear as if the purchased product for return is being provided or offered in the electronic marketplace 55 by the operator of the electronic marketplace.

The purchased product for return 22 may be offered for resale on the electronic marketplace 55 for a threshold time period before being processed as a normal return, for example, in the case where there are no purchasers at the resale price. The product exchange server 50 may adjust the resale price 26 of the purchased product for return 22 based upon time on the electronic marketplace 55. For example, the product exchange server 50 may reduce the resale price as time passes without being resold on the electronic marketplace 55. The reduction of the resale price, the time being listed on the electronic marketplace, and/or whether and when the purchased product for return 22 has sold may be provided as input to the machine learning algorithm for updating or training.

The product exchange server 50, at Block 74, communicates the shipping address 41 associated with the second purchaser to the first purchaser based upon a purchase of the purchased product for return 22 by the second purchaser in the electronic marketplace 55 (Block 72). More particularly, upon purchase at the resale price 26 of the purchased product for return 22 being purchased by the second user via the second user device 40, the product exchange server 50 communicates the shipping address 41, for example, embodied within a postage paid shipping label 28, to the first user (via the first user device 30) so that the first user can ship the purchased product for return to the second user. In other words, the purchased product for return 22 is shipped directly from the first purchaser (returner or, conceptually, seller) to the second purchaser (buyer). The product exchange server 50 may, at Block 72, poll for the purchase at the resale price of the purchased product for return 22.

The product exchange server 50 may optionally generate and communicate a digital promotion 57, for example, a digital coupon to the first purchaser via the first purchaser device 30 (Block 76). The digital promotion 57 may be redeemable toward another product of a same brand as the purchased product for return 22, for example. The digital promotion 57 may be alternatively or additionally be redeemable toward another purchased product for return for resale on the electronic marketplace 55. The digital promotion 57 may be redeemable as an addition to a return or sale value of the purchased product for return or toward the resale or return value of another purchased product for return (e.g., when provided in the electronic marketplace). The digital promotion 57 may have a redeemable value associated therewith, which may be determined based upon the resale price and/or product condition 23, for example, such that a purchased product for return that has a lower quality or worse condition may correspond to a digital promotion having a lower redeemable value. Alternatively, a purchased product for return that has a lower quality or worse condition may correspond to a digital promotion having a higher redeemable value. The redeemable value of the digital promotion 57 may be determined based upon the machine learning algorithm 54, for example. The digital promotion 57 may be communicated before, at, or after purchase of the purchased product for return 22 by the second user in the electronic marketplace 55 or upon obtaining of the image data for resale on the electronic marketplace.

The product exchange server 50 may optionally generate and communicate a digital promotion 58, for example, a digital coupon to the second purchaser via the second purchaser device 40 (Block 78). The digital promotion 58 may be redeemable toward another product of a same brand as the purchased product for return 22, for example. The digital promotion 58 may be alternatively or additionally be redeemable toward another product for resale on the electronic marketplace 55. The digital promotion 58 may have a redeemable value associated therewith, which may be determined based upon the resale price 26 and/or product condition 23, for example, such that a purchased product for return 22 that has a lower quality or worse condition may correspond to a digital promotion having a higher redeemable value (e.g., to incentivize purchase by the second purchaser). The redeemable value of the digital promotion

58 may be determined based upon the machine learning algorithm 54, for example. The digital promotion 58 may be communicated before, at, or after purchase of the purchased product for return 22 by the second user in the electronic marketplace 55. Operations end at Block 80.

A method aspect is directed to a method of processing a product exchange. The method includes using a product exchange server 50 to obtain image data of a purchased product for return 22 from a first purchaser device 30 associated with a first purchaser, and determine, using a machine learning algorithm 54, a product condition 23 of the purchased product for return based upon the obtained image data 21. The method also includes using the product exchange server 50 to determine, using the machine learning algorithm 54, a resale price 26 of the purchased product for return based upon the determined product condition, and operate an electronic marketplace for resale of the purchased product for return 22 at the resale price. The method further includes using the product exchange server 50 to communicate a shipping address 41 of a second purchaser 40 to the first purchaser device 30 based upon a purchase of the purchased product for return 22 by the second purchaser in the electronic marketplace 55 via a second purchaser device associated with the second purchaser.

A computer readable medium aspect is directed to a non-transitory computer readable medium for processing a product exchange. The non-transitory computer readable medium includes computer executable instructions that when executed by a processor 51 cause the processor to perform operations. The operations include obtaining image data 21 of a purchased product for return 22 from a first purchaser device 30 associated with a first purchaser, determining, using a machine learning algorithm 54, a product condition 23 of the purchased product for return based upon the obtained image data 21, and determining, using the machine learning algorithm, a resale price 26 of the purchased product for return based upon the determined product condition. The operations also include operating an electronic marketplace 55 for resale of the purchased product for return 22 at the resale price 26, and communicating a shipping address 41 of a second purchaser to the first purchaser device 30 based upon a purchase of the purchased product for return by the second purchaser in the electronic marketplace via a second purchaser device 40 associated with the second purchaser.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product exchange system comprising:
a first purchaser device associated with a first purchaser;
a second purchaser device associated with a second purchaser having a shipping address; and
a product exchange server configured to
obtain image data of a purchased product for return from the first purchaser device,
determine, using a machine learning algorithm, a product condition of the purchased product for return based upon the obtained image data by at least
segmenting the obtained image data into segments corresponding to different parts of the purchased product for return and updating the machine learning algorithm with the obtained image data, and
comparing each segment to baseline image data to determine a match to learned product conditions for a given product condition category from among a plurality of different product condition categories by using bins of a histogram corresponding to the plurality of different product condition categories and applying a probabilistic distribution,
determine, using the machine learning algorithm, a resale price of the purchased product for return based upon the determined product condition,
operate an electronic marketplace for resale of the purchased product for return at the resale price, and
communicate the shipping address of the second purchaser to the first purchaser device based upon a purchase of the purchased product for return by the second purchaser in the electronic marketplace via the second purchaser device.

2. The product exchange system of claim 1 wherein the product exchange server is configured to generate and communicate a digital promotion to the first purchaser via the first purchaser device.

3. The product exchange system of claim 2 wherein the purchased product for return has a brand associated therewith; and wherein the digital promotion is redeemable toward another product of the brand.

4. The product exchange system of claim 1 wherein the product exchange server is configured to generate and communicate a digital promotion to the second purchaser via the second purchaser device.

5. The product exchange system of claim 4 wherein the digital promotion is redeemable toward purchase of another product on the electronic marketplace.

6. The product exchange system of claim 1 wherein the product exchange server is configured to determine the resale price based upon learning resale prices for other products for return corresponding to a same product condition.

7. The product exchange system of claim 1 wherein the product exchange server is configured to generate a shipping label and communicate the shipping address within shipping label.

8. A product exchange server comprising:
a processor and an associated memory configured to
obtain image data of a purchased product for return from a first purchaser device associated with a first purchaser,
determine, using a machine learning algorithm, a product condition of the purchased product for return based upon the obtained image data by at least
segmenting the obtained image data into segments corresponding to different parts of the purchased product for return and updating the machine learning algorithm with the obtained image data, and
comparing each segment to baseline image data to determine a match to learned product conditions for a given product condition category from among a plurality of different product condition categories by using bins of a histogram corresponding to the plurality of different product condition categories and applying a probabilistic distribution,
determine, using the machine learning algorithm, a resale price of the purchased product for return based upon the determined product condition,
operate an electronic marketplace for resale of the purchased product for return at the resale price, and
communicate a shipping address of a second purchaser to the first purchaser device based upon a purchase of the purchased product for return by the second purchaser in the electronic marketplace via a second purchaser device associated with the second purchaser.

9. The product exchange server of claim 8 wherein the processor is configured to generate and communicate a digital promotion to the first purchaser via the first purchaser device.

10. The product exchange server of claim 9 wherein the purchased product for return has a brand associated therewith; and wherein the digital promotion is redeemable toward another product of the brand.

11. The product exchange server of claim 8 wherein the processor is configured to generate and communicate a digital promotion to the second purchaser via the second purchaser device.

12. The product exchange server of claim 11 wherein the digital promotion is redeemable toward purchase of another product on the electronic marketplace.

13. The product exchange server of claim 8 wherein the processor is configured to determine the resale price based upon learning resale prices for other products for return corresponding to a same product condition.

14. A method of processing a product exchange comprising:
using a product exchange server to
obtain image data of a purchased product for return from a first purchaser device associated with a first purchaser,
determine, using a machine learning algorithm, a product condition of the purchased product for return based upon the obtained image data by at least
segmenting the obtained image data into segments corresponding to different parts of the purchased product for return and updating the machine learning algorithm with the obtained image data, and
comparing each segment to baseline image data to determine a match to learned product conditions for a given product condition category from among a plurality of different product condition categories by using bins of a histogram corresponding to the plurality of different product condition categories and applying a probabilistic distribution,
determine, using the machine learning algorithm, a resale price of the purchased product for return based upon the determined product condition,
operate an electronic marketplace for resale of the purchased product for return at the resale price, and
communicate a shipping address of a second purchaser to the first purchaser device based upon a purchase of the purchased product for return by the second purchaser in the electronic marketplace via a second purchaser device associated with the second purchaser.

15. The method of claim 14 wherein using the product exchange server comprises using the product exchange server to generate and communicate a digital promotion to the first purchaser via the first purchaser device.

16. The method of claim 14 wherein using the product exchange server comprises using the product exchange server to generate and communicate a digital promotion to the second purchaser via the second purchaser device.

17. The method of claim 14 wherein using the product exchange server comprises using the product exchange server to determine the resale price based upon learning resale prices for other products for return corresponding to a same product condition.

18. A non-transitory computer readable medium for processing a product exchange, the non-transitory computer readable medium comprising computer executable instructions that when executed by a processor cause the processor to perform operations comprising:
obtaining image data of a purchased product for return from a first purchaser device associated with a first purchaser,
determining, using a machine learning algorithm, a product condition of the purchased product for return based upon the obtained image data by at least
segmenting the obtained image data into segments corresponding to different parts of the purchased product for return and updating the machine learning algorithm with the obtained image data, and
comparing each segment to baseline image data to determine a match to learned product conditions for a given product condition category from among a plurality of different product condition categories by using bins of a histogram corresponding to the plurality of different product condition categories and applying a probabilistic distribution;
determining, using the machine learning algorithm, a resale price of the purchased product for return based upon the determined product condition,
operating an electronic marketplace for resale of the purchased product for return at the resale price, and
communicating a shipping address of a second purchaser to the first purchaser device based upon a purchase of the purchased product for return by the second purchaser in the electronic marketplace via a second purchaser device associated with the second purchaser.

19. The non-transitory computer readable medium of claim 18 wherein the operations comprise generating and communicating a digital promotion to the first purchaser via the first purchaser device.

20. The non-transitory computer readable medium of claim 18 wherein the operations comprise generating and communicating a digital promotion to the second purchaser via the second purchaser device.

21. The non-transitory computer readable medium of claim 18 wherein the operations comprise determining the resale price based upon learning resale prices for other products for return corresponding to a same product condition.

22. A product exchange server comprising:
a processor and an associated memory configured to
obtain image data of a purchased product for return from a first purchaser device associated with a first purchaser,
determine, using a machine learning algorithm, a product condition of the purchased product for return based upon the obtained image data by at least
segmenting the obtained image data into segments corresponding to different parts of the purchased product for return and updating the machine learning algorithm with the obtained image data, and comparing each segment to baseline image data to determine a match to learned product conditions for a given product condition category, determine, using the machine learning algorithm, a resale price of the purchased product for return based upon the determined product condition, operate an electronic marketplace for resale of the purchased product for return at the resale price, communicate a shipping address of a second purchaser to the first purchaser device based upon a purchase of the purchased product for return by the second purchaser in the electronic marketplace via a second purchaser device associated with the second purchaser, and generate a digital promotion to the first purchaser via the first purchaser device, the digital promotion having a redeemable value associated therewith determined based upon the product condition so that a purchased product for return having a lesser product condition corresponds to a digital coupon having a lower redeemable value.

23. The product exchange server of claim 22 wherein the processor is configured to generate the digital promotion to have the redeemable value based upon the resale price.

24. The product exchange server of claim 22 wherein the processor is configured to determine, using the machine learning algorithm, the redeemable value.

25. The product exchange server of claim 22 wherein the processor is configured to communicate the digital promotion to the first purchaser via the first purchaser device.

26. The product exchange server of claim 22 wherein the processor is configured to communicate the digital promotion to the second purchaser via the second purchaser device.

27. The product exchange server of claim 22 wherein the processor is configured to determine the resale price based upon learning resale prices for other products for return corresponding to a same product condition.

28. A product exchange server comprising:
a processor and an associated memory configured to
obtain image data of a purchased product for return from a first purchaser device associated with a first purchaser, obtain historical resale purchase data for the purchased product for return, determine, using a machine learning algorithm, a product condition of the purchased product for return based upon the obtained image data by at least
segmenting the obtained image data into segments corresponding to different parts of the purchased product for return and updating the machine learning algorithm with the obtained image data, and comparing each segment to baseline image data to determine a match to learned product conditions for a given product condition category, determine, using the machine learning algorithm, a resale price of the purchased product for return based upon the determined product condition and the obtained historical resale purchase data, operate an electronic marketplace for resale of the purchased product for return at the resale price, and communicate a shipping address of a second purchaser to the first purchaser device based upon a purchase of the purchased product for return by the second purchaser in the electronic marketplace via a second purchaser device associated with the second purchaser.

29. The product exchange server of claim 28 wherein the processor is configured to obtain the historical resale purchase data from at least one of a website and a point-of-sale (POS) terminal.

30. The product exchange server of claim 28 wherein the historical resale purchase data comprises historical resale prices and corresponding conditions for the purchased product for return.

31. The product exchange server of claim 28 wherein the processor is configured to generate and communicate a digital promotion to at least one of the first purchaser via the first purchaser device and the second purchaser via the second purchaser device.

\* \* \* \* \*